[11] 3,572,904

[72] Inventors Raymond E. Tibbetts
Mahopac;
Janusz S. Wilczynski, Ossining, N.Y.
[21] Appl. No. 825,120
[22] Filed May 5, 1969
[45] Patented Mar. 30, 1971
[73] Assignee International Business Machines
Corporation
Armonk, N.Y.
Continuation-in-part of application Ser. No. 573,698, Aug. 19, 1966, now abandoned.

[54] OPTICAL REDUCTION LENS SYSTEM
4 Claims, 7 Drawing Figs.
[52] U.S. Cl. ........................................ 350/215,
350/207, 350/210
[51] Int. Cl. ........................................ G02b 9/62
[50] Field of Search.......................................... 350/215,
207, 210

[56] References Cited
UNITED STATES PATENTS
2,701,982  2/1955  Angenieux ................... 350/215
2,846,923  8/1958  Tronnier ....................... 350/215X

*Primary Examiner*—David Schonberg
*Assistant Examiner*—Paul A. Sacher
*Attorneys*—Hanifin and Jancin and John J. Goodwin ABSTRACT: A lens group is described for use as a reduction lens. The lens group consists of eight lens elements. The first and second lens elements are meniscus singlet lenses. The third and fourth lens elements are cemented together to form a meniscus doublet lens. The fifth lens element is a negative meniscus singlet lens and the sixth and seventh lens elements are cemented together to form a meniscus doublet lens. The eighth lens element is a biconvex lens. The lens group has a high uniform resolution over the useable field, a flat image field with practically no zonal astigmatism, no mechanical vignetting, and virtually unmeasurable distortion.

| LENS | RADIUS | THICKNESS (t) OR AIRSPACE (S) | $N_D$ | V |
|---|---|---|---|---|
| I | $R_1 = +2.0604\,F$<br>$R_2 = +7.5369\,F$ | $t_1 = .0657\,F$<br>$S_1 = .0042\,F$ | 1.69089 | 54.80 |
| II | $R_3 = +0.6201\,F$<br>$R_4 = +1.4290\,F$ | $t_2 = .0708\,F$<br>$S_2 = .0042\,F$ | 1.69089 | 54.80 |
| III | $R_5 = +0.3320\,F$<br>$R_6 = +0.7223\,F$ | $t_3 = .1028\,F$<br>$t_4 = .0421\,F$ | 1.69089 | 54.80 |
| IV |  $R_7 = +0.2240\,F$ | $S_3 = .1500\,F$ | 1.64752 | 33.88 |
| V | $R_8 = +1.1934\,F$<br>$R_9 = +0.6130\,F$ | $t_5 = .0337\,F$<br>$S_4 = .1155\,F$ | 1.64752 | 33.88 |
| VI | $R_{10} = -0.2802\,F$<br>$R_{11} = -0.5852\,F$ | $t_6 = .0337\,F$<br>$t_7 = .0784\,F$ | 1.60328 | 38.02 |
| VII | $R_{12} = -0.3979\,F$ | $S_5 = .0042\,F$ | 1.69089 | 54.80 |
| VIII | $R_{13} = +1.5254\,F$<br>$R_{14} = -0.7740\,F$ | $t_8 = .0759\,F$ | 1.69089 | 54.80 |

EFL = 111.52 F/3

$\delta l' = -.048$ MM  $\lambda = 4047$ Å

DIFFRACTION LIMIT

AXIS

SPATIAL FREQUENCY  748 LINES/MM

— ○ — ○ — ○ — SAGITTAL   — + — + — + — TANGENTIAL   — · — · — TANGENTIAL (IMAGINARY PART)

.7 FIELD

SPATIAL FREQUENCY  748 LINES/MM

FULL FIELD

SPATIAL FREQUENCY  748 LINES/MM

OPTICAL REDUCTION LENS SYSTEM

This application is a continuation-in-part of copending parent patent application, Ser. No. 573,698, filed Aug. 19, 1966, now abandoned.

BACKGROUND OF THE INVENTION

1. Field of the Invention

The present invention is in the field of optics and more particularly relates to a lens group including lens elements.

2. Description of the Prior Art

Lens groups which somewhat resemble the lens group of the present invention are shown in U.S. Pat. No. 2,662,447, issued Dec. 15, 1953, to A. W. Tronnier, and U.S. Pat. No. 2,975,673, issued Mar. 21, 1961, to W. Mandler et al.

The lens group of the present invention is distinct over the prior art in that the constructional data of the lens elements are selected from specified ranges to provide a uniformly high resolution reduction lens.

SUMMARY OF THE INVENTION

Reduction lenses of high quality are useful for many applications, particularly in the fabrication of semiconductor integrated circuits by optical methods wherein circuit element images are reduced and projected onto the plane surface of semiconductor wafers.

The high uniform quality of the present lens over the entire field renders it very useful as a reduction projection lens for the optical fabrication of small semiconductor devices. The usual step and repeat process for making transistors, resistors, diodes, etc., on a wafer is eliminated by using the present lens which is capable of exposing the entire wafer surface at one time with high quality results.

An object of the present invention is to provide an improved lens group for use as a reduction lens.

Another object of the present invention is to provide a lens having eight elements with an aperture between the fourth and fifth lens elements.

The foregoing and other objects, features and advantages of the invention will be apparent from the following more particular description of the preferred embodiment of the invention, as illustrated in the accompanying drawings.

DESCRIPTION OF THE PREFERRED EMBODIMENT

Figures 1, 2:
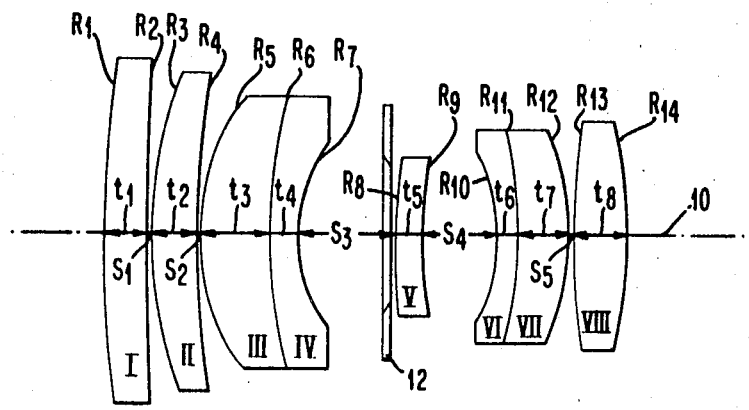
FIG. 1 shows an optical diagram of a reduction lens constructed according to the present invention.
FIG. 2 shows a chart of the constructional data for the lens of FIG. 1.

Referring to FIG. 1, an optical diagram of an embodiment of a reduction lens according to the principles of the present invention is shown. The lens group consists of eight lens elements. Lenses I and II are meniscus singlet lenses. Lenses III and IV form a meniscus cemented doublet lens. Lens V is a negative meniscus singlet lens and lenses VI and VII form a meniscus doublet lens. Lens VIII is a biconvex lens. The lenses are optically aligned on an axis 10 to have an effective focal length of 111.52 mm., a back focal length of 54.10 mm., a front focal length of 48.95 mm. A fixed stop 12 of 21.1 mm. diameter at $f/3$ is located 1.2 mm. to the left of lens element V. The following table of mathematical statement lists the range of constructional data related to the lens group shown in FIG. 1.

$1.75F < +R_1 < 2.35F$ $6.70F < +R_2 < 8.60F$ $0.53F < +R_3 < 0.71F$ $1.20F < +R_4 < 1.65F$ $0.25F < +R_5 < 0.39F$ $0.61F < +R_6 < 0.83F$ $0.18F < +R_7 < 0.26F$ $1.00F < +R_8 < 1.38F$ $0.52F < +R_9 < 0.70F$ $0.24F < -R_{10} < 0.32F$ $0.49F < -R_{11} < 0.67F$ $0.34F < -R_{12} < 0.46F$ $1.28F < +R_{13} < 10\,1.76F$ $0.65F < -R_{14} < 0.89F$ $0.056F < t_1 < 0.076F$ $0.0036F < S_1 < 0.0048F$ $0.060F < t_2 < 0.082F$ $0.0036F < S_2 < 0.0048F$ $0.090F < t_3 < 0.116F$ $0.037F < t_4 < 0.047F$ $0.130F < S_3 < 0.170F$ $0.028F < t_5 < 0.039F$ $0.090F < S_4 < 0.130F$ $0.028F < t_6 < 0.039F$ $0.066F < t_7 < 0.090F$ $0.0036F < S_5 < 0.0048F$ $0.062F < t_8 < 0.088F$ where $F$ represents the equivalent focal length of the lens group (111.52 mm.) at 4,047 Angstroms, $R_1$ through $R_{14}$ represent the radii of the successive lens surfaces, $t_1$ through $t_8$ designate the thickness of the successive lenses measured along axis 10, and $S_1$ through $S_5$ represent the spacing between lenses I and II, II and III, IV and V, V and VI, and VII and VIII measured along axis 10. One preferred form of the lens group shown in FIG. 1 is listed in the table of FIG. 2 wherein the $R$, $t$, and $S$ designations are as described, and the designations $N_D$ and $V$, respectively, represent the refractive index and the Abbe number of each lens element.

FIG. 2 specifies the constructional data for an embodiment of a lens group according to FIG. 1 selected from the aforesaid table of ranges of constructional data.

Figure 3:
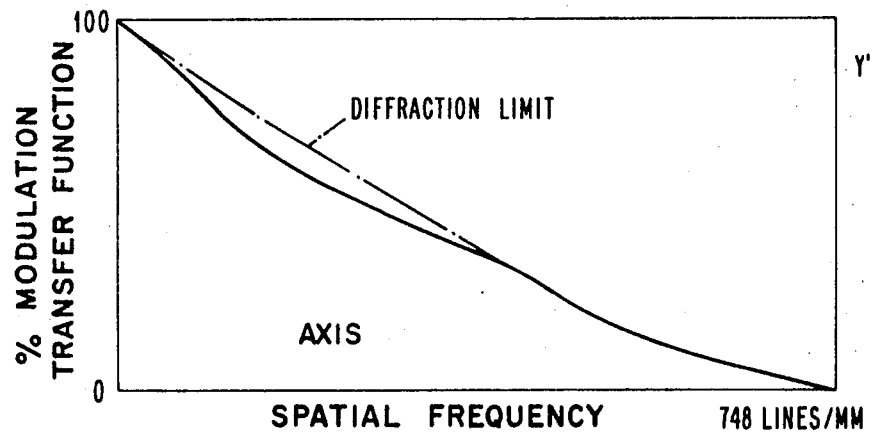
FIG. 3 shows a curve of the modulation transfer function of the axis of the lens of FIG. 1.
Figure 4:
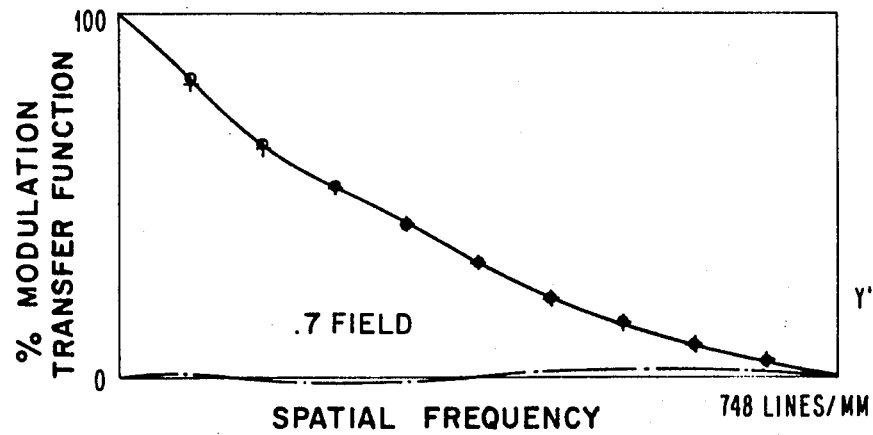
FIG. 4 shows a curve of the modulation transfer function of the lens of FIG. 1 at 0.7 field.
Figure 5:
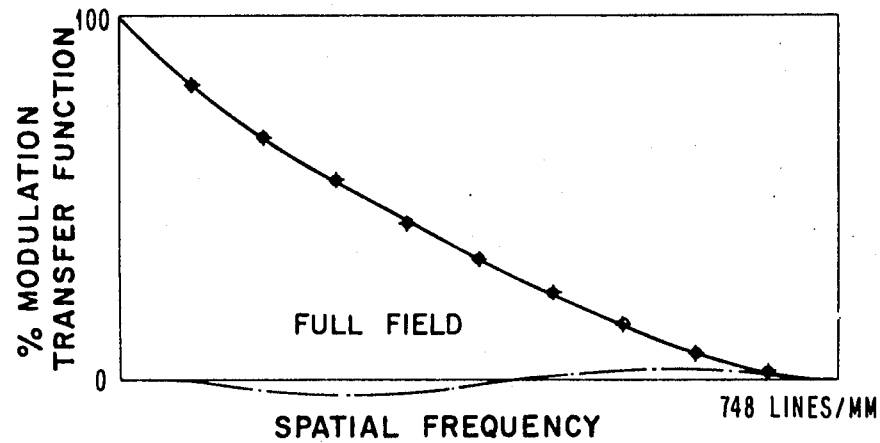
FIG. 5 shows a curve of the modulation transfer function of the lens of FIG. 1 at full field.

Referring to FIGS. 3, 4 and 5, the curve of the modulation transfer function of the lens group of FIGS. 1 and 2 at a linear field of ±16 mm. is shown for the axis of the lens, for 0.7 field, and for full field all calculated at one focal setting, 0.048 mm. in front of the paraxial focal plane. FIG. 3 illustrates that the departure from the diffraction limit is extremely small.

In FIGS. 4 and 5 the sagittal fan, the tangential fan, and the imaginary parts of the tangential fan are shown for 0.7 of the field and for full field. The imaginary parts of the tangential fans are exceedingly small, indicating the factors: which judicious choice the lens at all points in the field have almost perfect rotational symmetry about their respective principal rays.

Figure 6:
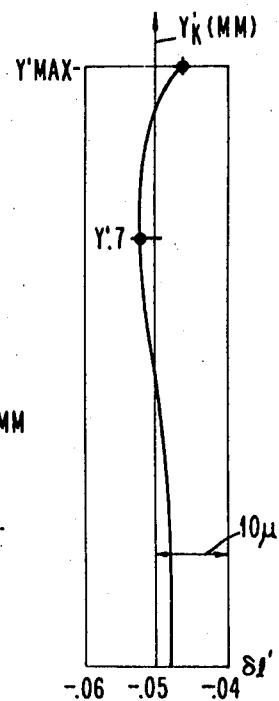
FIG. 6 shows a curve of the astigmatism of the lens of FIG. 1.

The reversal of sign of the imaginary parts denotes a balance of the residual coma. The residual field curvature is very nearly that of the sagittal fan alone, the astigmatism being vanishingly small (see FIG. 6).

Figure 7:
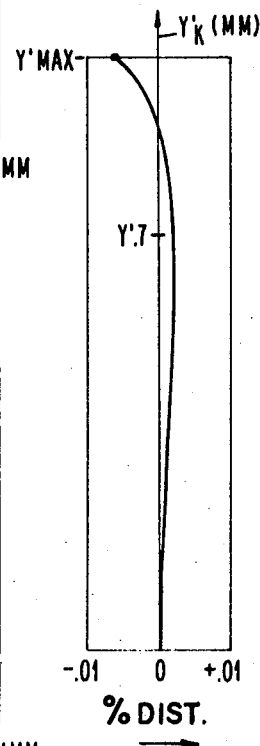
FIG. 7 shows a curve of the distortion of the lens of FIG. 1.

FIG. 7 illustrates that the distortion is of such small magnitude as to be nearly unmeasurable and of such a balanced state as to yield the best orthoscopic results.

At the best focal setting, $\delta 1' = -0.048$ mm., the maximum deviation from a flat surface is $\pm 4$ microns, well within the total allowable focal range of 17 microns ($\lambda = 4,047$ A.). This small residual of sagittal field curvature is mainly effected by two factors: the judicious choice of power of lens element V, and the position of the diaphragm.

The power of lens element V relative to the total lens power, as a function of the desired field angle, is exceedingly important. If the ratio $$K = \frac{\text{power of lens element } V}{\text{power of the whole lens group}}$$

is too high; viz, approaching $-1$, the useable field must decrease due to the uncorrectable zonal sagittal field curvature growing as fourth power of the field angle. If the ratio degenerates towards zero, the zonal sagittal field curvature becomes less but the oblique spherical aberration common to the classic Gauss Lens becomes excessive, thereby causing the sagittal MTF to sag further downwards at the corner of the field. Therefore, it behooves the designer to select the proper ratio $K$ for the desired field angle. The lens described here has a ratio $K$ of $-0.5$ as a best compromise between zonal sagittal field curvature and oblique spherical aberration of the sagittal fan. If the field angle were, say, halved, the ratio $K$ could advance to approximately $-0.7$ or $-0.8$ and yet a well-corrected lens could be designed. If the field angle were doubled, the ratio $K$ should degenerate to zero and a normal Gauss Lens with its sagittal oblique spherical aberration would evolve.

The shape of the negative element in the center is quite important in setting the proper balance of higher order comas. The lens can be designed in such a manner that it satisfies the sine condition and still makes it possible to balance properly the comas growing as the cube of the field. This gives extremely good performance also in the 45° azimuth angle.

The small higher order astigmatism is partially effected by the position of the diaphragm which very nearly equalizes the angles of the entering and emerging principal rays. This type of correction is greatly desired in the production of miniature components because of its greater depth of focus. The wafer may be displaced axially within the focal range from the best focal position and yet good results will be obtained. The same cannot be said of lenses corrected across the field such that the sagittal and tangential foci at first diverge to a maximum zone then converge through a node and then rapidly diverge again.

The high uniform quality of the present lens over the entire field renders it very useful as a reduction projection lens for the optical fabrication of small semiconductor devices. The usual step and repeat process for making transistors, resistors, diodes, etc. on a wafer is eliminated by using the present lens which is capable of exposing the entire wafer surface at one time with high quality results.

The working magnification of the lens is $0.1X$ with a round field diameter of 1.25 inches, with a cutoff frequency of over 700 lines/mm. at 4,047 Angstroms across such field. Since it is common practice to use one-half the cutoff frequency to determine the minimum bit size for commercially acceptable use, the present lens will yield in the order of $10^8$ bits per exposure on a 1.25-inch diameter circular wafer.

Seven additional embodiments of the present invention will be hereinafter set forth as embodiments 2 through 8, The embodiments have different constructional data than that of FIG. 2 and particular parameters have been selected to be at the limits of the ranges set forth in the table. After specifying the embodiments, the modulation transfer functions of the embodiments at axis, at 0.7 field and at full field are compared in tabular form with the modulation transfer functions of the preferred embodiment illustrated in FIGS. 3, 4 and 5. The modulation transfer functions of embodiments 2 through 8 cannot be compared graphically with those shown in FIGS. 3, 4 and 5 because the scale used would not show any distinction. This is an indication that all eight embodiments provide the same high correction as will other embodiments of the invention within the specified constructional ranges.

EMBODIMENT 2

| | |
|---|---|
| $R_1 = +2.0771F$ | $t_1 = 0.0560F$ |
| $R_2 = +7.7386F$ | $S_1 = 0.0042F$ |
| $R_3 = +0.6212F$ | $t_2 = 0.0710F$ |
| $R_4 = +1.4358F$ | $S_2 = 0.0042F$ |
| $R_5 = +0.3325F$ | $t_3 = 0.1030F$ |
| $R_6 = +0.7227F$ | $t_4 = 0.0422F$ |
| $R_7 = +0.2243F$ | $S_3 = 0.1503F$ |
| $R_8 = +1.1941F$ | $t_5 = 0.0338F$ |
| $R_9 = +0.6138F$ | $S_4 = 0.1157F$ |
| $R_{10} = -0.2807F$ | $t_6 = 0.0338F$ |
| $R_{11} = -0.5860F$ | $t_7 = 0.0785F$ |
| $R_{12} = -0.3986F$ | $S_5 = 0.0042F$ |
| $R_{13} = +1.5390F$ | $t_8 = 0.0760F$ |

$$R_{14} = A10.7736F$$

In this embodiment, $t_1$ is at the lower limit and the other parameters have been changed to retain the high state of correction.

EMBODIMENT 3

| | |
|---|---|
| $R_1 = +2.0913F$ | $t_1 = 0.0656F$ |
| $R_2 = +7.6003F$ | $S_1 = 0.0042F$ |
| $R_3 = +0.6188F$ | $t_2 = 0.0707F$ |
| $R_4 = +1.4336F$ | $S_2 = 0.0042F$ |
| $R_5 = +0.3322F$ | $t_3 = 0.1026F$ |
| $R_6 = +0.7199F$ | $t_4 = 0.0420F$ |
| $R_7 = +0.2244F$ | $S_3 = 0.1496F$ |
| $R_8 = +1.1721F$ | $t_5 = 0.0389F$ |
| $R_9 = +0.6066F$ | $S_4 = 0.1152F$ |
| $R_{10} = -0.2781F$ | $t_6 = 0.0336F$ |
| $R_{11} = -0.5837F$ | $t_7 = 0.0782F$ |
| $R_{12} = -0.3950F$ | $S_5 = 0.0042F$ |
| $R_{13} = +1.5331F$ | $t_8 = 0.0757F$ |

$$R_{14} = 162$$

In $-0.7701F$

In this embodiment, $t_5$ is at its upper limit.

EMBODIMENT 4

| | |
|---|---|
| $R_1 = +2.0758F$ | $t_1 = 0.0658F$ |
| $R_2 = +7.7582F$ | $S_1 = 0.0042F$ |

$R_3=+0.6221F$    $t_2=0.0709F$ $R_4=+1.4355F$    $S_2=0.0042F$ $R_5=+0.3326F$    $t_3=0.1030F$ $R_6=+0.7238F$    $t_4=0.0422F$ $R_7=+0.2244F$    $S_3=0.1502F$ $R_8=+1.2010F$    $t_5=0.0338F$ $R_9=+0.6154F$    $S_4=0.1156F$ $R_{10}=-0.2798F$    $t_6=0.0280F$ $R_{11}=-0.5796F$    $t_7=0.0842F$ $R_{12}=-0.3969F$    $S_5=0.0042F$ $R_{13}=+1.5371F$    $t_8=0.0760F$ $R_{14}=-0.7721F$

In this embodiment, $t_6$ is at its lower limit.

EMBODIMENT 5

$R_1=+2.0779F$    $t_1=0.0652F$ $R_2=+7.8334F$    $S_1=0.0042F$ $R_3=+0.6169F$    $t_2=0.0703F$ $R_4=+1.4450F$    $S_2=0.0042F$ $R_5=+0.3318F$    $t_3=0.1020F$ $R_6=+0.7124F$    $t_4=0.0418F$ $R_7=+0.2243F$    $S_3=0.1488F$ $R_8=+1.1241F$    $t_5=0.0267F$ $R_9=+0.5919F$    $S_4=0.1290F$ $R_{10}=-0.2745F$    $t_6=0.0334F$ $R_{11}=-0.5817F$    $t_7=0.0777F$ $R_{12}=-0.3885F$    $S_5=0.0042F$ $R_{13}=+1.5787F$    $t_8=0.0752F$ $R_{14}=-0.7665F$

In this embodiment, $S_4$ is at its upper limit.

EMBODIMENT 6

$R_1=+1.7450F$    $t_1=0.0655F$ $R_2=+4.2312F$    $S_1=0.0042F$ $R_3=+0.6245F$    $t_2=0.0706F$ $R_4=+1.5214F$    $S_2=0.0042F$ $R_5=+0.3336F$    $t_3=0.1025F$ $R_6=+0.7211F$    $t_4=0.0420F$ $R_7=+0.2244F$    $S_3=0.1495F$ $R_8=+1.1652F$    $t_5=0.0336F$ $R_9=+0.6044F$    $S_4=0.1151F$ $R_{10}=-0.2782F$    $t_6=0.0336F$ $R_{11}=-0.5815F$    $t_7=0.0781F$ $R_{12}=-0.3970F$    $S_5=0.0042F$ $R_{13}=+1.5652F$    $t_8=0.0756F$ $R_{14}=-0.7565F$

In this embodiment, $R_1$ is below its lower limit.

EMBODIMENT 7

$R_1=+2.1737F$    $t_1=0.0656F$ $R_2=+7.3868F$    $S_1=0.0042F$ $R_3=+0.6196F$    $t_2=0.0707F$ $R_4=+1.4861F$    $S_2=0.0042F$ $R_5=+0.3380F$    $t_3=0.1026F$ $R_6=+0.6991F$    $t_4=0.0420F$ $R_7=+0.2275F$    $S_3=0.1497F$ $R_8=+1.3792F$    $t_5=0.0337F$ $R_9=+0.6581F$    $S_4=0.1123F$ $R_{10}=-0.2760F$    $t_6=0.0337F$ $R_{11}=-0.6068F$    $t_7=0.0782F$ $R_{12}=-0.3875F$    $S_5=0.0042F$ $R_{13}=+1.5718F$    $t_8=0.0757F$ $R_{14}=-0.7826F$

In this embodiment, $R_8$ is at its upper limit.

EMBODIMENT 8

$R_1=+1.4897F$    $t_1=0.0657F$ $R_2=+3.3755F$    $S_1=0.0042F$ $R_3=+0.7111F$    $t_2=0.0708F$ $R_4=+1.7772F$    $S_2=0.0042F$ $R_5=+0.3250F$    $t_3=0.1027F$ $R_6=+0.7039F$    $t_4=0.0421F$ $R_7=+0.2239F$    $S_3=0.1499F$ $R_8=+1.3298F$    $t_5=0.0337F$ $R_9=+0.6470F$    $S_4=0.1165F$ $R_{10}=-0.2756F$    $t_6=0.0337F$ $R_{11}=-0.5780F$    $t_7=0.0783F$ $R_{12}=-0.3856F$    $S_5=0.0042F$ $R_{13}=+1.4759F$    $t_8=0.0758F$ $R_{14}=-0.8114F$

In this embodiment, $R_3$ is at its upper limit.

The following table sets forth the modulation transfer function of the eight embodiments. It can be seen that although given parameters were selected at the end of the ranges, the eight embodiments provide almost equal performance.

COMPARISON OF PREFERRED EMBODIMENT
OTHER EMBODIMENTS AT EDGES OF LIMITS

| Embodiment | Percent of limiting freq. | Axis | Percent MTF | | | |
|---|---|---|---|---|---|---|
| | | | .7 field | | Full field | |
| | | | Sag | Tan | Sag | Tan |
| Preferred | 25 | 60.4 | 62.4 | 62.7 | 58.1 | 56.1 |
| | 50 | 37.2 | 35.5 | 35.9 | 30.2 | 28.7 |
| | 75 | 14.4 | 13.6 | 12.8 | 8.6 | 9.2 |
| Two | 25 | 59.0 | 61.4 | 61.2 | 59.5 | 58.8 |
| | 50 | 36.8 | 35.1 | 35.0 | 31.5 | 30.9 |
| | 75 | 14.2 | 13.3 | 12.6 | 9.5 | 10.4 |
| Three | 25 | 59.3 | 61.7 | 61.6 | 59.6 | 57.2 |
| | 50 | 36.9 | 35.4 | 35.3 | 31.0 | 30.0 |
| | 75 | 14.3 | 61.7 | 61.6 | 9.3 | 9.8 |
| Four | 25 | 58.7 | 60.8 | 60.6 | 60.1 | 59.3 |
| | 50 | 36.8 | 34.6 | 34.7 | 32.0 | 31.4 |
| | 75 | 14.0 | 13.2 | 12.4 | 9.9 | 10.8 |
| Five | 25 | 59.4 | 61.1 | 60.2 | 61.0 | 59.3 |
| | 50 | 37.0 | 35.1 | 34.6 | 32.1 | 32.1 |
| | 75 | 14.3 | 13.2 | 11.5 | 9.6 | 11.2 |
| Six | 25 | 59.7 | 60.7 | 59.9 | 60.7 | 59.5 |
| | 50 | 37.0 | 34.5 | 33.9 | 32.3 | 31.9 |
| | 75 | 14.4 | 13.2 | 11.9 | 10.0 | 10.8 |
| Seven | 25 | 59.4 | 59.6 | 58.1 | 61.1 | 59.8 |
| | 50 | 37.0 | 33.2 | 31.6 | 33.0 | 31.3 |
| | 75 | 14.3 | 12.5 | 11.4 | 10.5 | 11.2 |
| Eight | 25 | 58.0 | 62.1 | 60.7 | 58.4 | 60.0 |
| | 50 | 36.5 | 35.4 | 33.8 | 30.9 | 31.9 |
| | 75 | 13.8 | 13.3 | 12.1 | 9.4 | 10.2 |

While the invention has been particularly shown and described with reference to preferred embodiments thereof, it will be understood by those skilled in the art that various changes in form and details may be made therein without departing from the spirit and scope of the invention.

We claim:

1. A lens group for a reduction lens comprising:
first, second, third, fourth, fifth, sixth, seventh and eighth optically aligned lens elements, said first, second, fifth and eighth lens elements being singlet lenses;
said third and fourth lens elements forming a first cemented doublet lens, and said sixth and seventh lens elements forming a second cemented doublet lens;
and a diaphragm optically aligned with said lens elements and positioned between said fourth and fifth lens elements;
said first through eighth lenses having respective radii, thickness and spacings $R_1$ through $R_{14}$, $t_1$ through $t_8$, and $S_1$ through $S_5$ within limits as set forth in the given table where $F$ is the effective focal length of the lens group, $$1.75F < +R_1 < 2.35F$$
$$6.70F < +R_2 < 8.60F$$
$$0.53F < +R_3 < 0.71F$$
$$1.20F < +R_4 < 1.65F$$
$$0.25F < +R_5 < 0.39F$$
$$0.61F < +R_6 < 0.83F$$
$$0.18F < +R_7 < 0.26F$$
$$1.00F < +R_8 < 1.38F$$
$$0.52F < +R_9 < 0.70F$$
$$0.24F < -R_{10} < 0.32F$$
$$0.49F < -R_{11} < 0.67F$$
$$0.34F < -R_{12} < 0.46F$$
$$1.28F < +R_{13} < 1.76F$$
$$0.65F < -R_{14} < 0.89F$$
$$0.056F < t_1 < 0.076F$$
$$0.0036F < S_1 < 0.0048F$$
$$0.060F < t_2 < 0.082F$$
$$0.0036F < S_2 < 0.0048F$$
$$0.090F < t_3 < 0.116F$$
$$0.037F < t_4 < 0.047F$$
$$0.130F < S_3 < 0.170F$$
$$0.028F < t_5 < 0.039F$$
$$0.090F < S_4 < 0.130F$$
$$0.028F < t_6 < 0.039F$$
$$0.066F < t_7 < 0.090F$$
$$0.0036F < S_5 < 0.0048F$$
$$0.062F < t_8 < 0.088F$$

2. A lens group according to claim 1 wherein said diaphragm is spaced a distance 1.2 millimeters from said fifth lens element.

3. A lens group having numerical data substantially as follows:

| Lens | Radius | Thickness (t) or Airspace (S) | $N_D$ | V |
|---|---|---|---|---|
| I | $R_1 = +2.0604F$ | $t_1 = .0657F$ | 1.69089 | 54.80 |
| | $R_2 = +7.5369F$ | $S_1 = .0042F$ | | |
| II | $R_3 = +0.6201F$ | $t_2 = .0708F$ | 1.69089 | 54.80 |
| | $R_4 = +1.4290F$ | $S_2 = .0042F$ | | |
| III | $\{R_5 = +0.3320F$ | $t_3 = .1028F$ | 1.69089 | 54.80 |
| IV | $\{R_6 = +0.7223F$ | $t_4 = .0421F$ | 1.64752 | 33.88 |
| | $\{R_7 = +0.2240F$ | $S_3 = .1500F$ | | |
| V | $R_8 = +1.1934F$ | $t_5 = .0337F$ | 1.64752 | 33.88 |
| | $R_9 = +0.6130F$ | $S_4 = .1155F$ | | |
| VI | $\{R_{10} = -0.2802F$ | $t_6 = .0337F$ | 1.60328 | 38.02 |
| VII | $\{R_{11} = -0.5852F$ | $t_7 = .0784F$ | 1.69089 | 54.80 |
| | $\{R_{12} = -0.3979F$ | $S_5 = .0042F$ | | |
| VIII | $R_{13} = +1.5254F$ | $t_8 = .0759F$ | 1.69089 | 54.80 |
| | $R_{14} = -0.7740F$ | | | | wherein $R_1$ through $R_{14}$ represent the radius of curvature of the individual lens elements;
$t_1$ through $t_8$ represent the axial thickness of the individual lens elements;
$S_1$ through $S_5$ represent the axial spacing of the individual lens elements;
$N_D$ represents refractive index of the individual lens elements; and
$V$ represents the Abbe number of the individual lens elements.

4. A lens group according to claim 3 wherein said diaphragm is spaced a distance 1.2 millimeters from said fifth lens element.